United States Patent
Aanenson

(10) Patent No.: US 7,137,222 B2
(45) Date of Patent: Nov. 21, 2006

(54) DOWNRIGGER APPARATUS WITH SOUND EMITTING DEVICE

(76) Inventor: Eric E. Aanenson, 3424 Keha Dr., Kihei, HI (US) 96753

(*) Notice: Subject to any disclaimer, the term of this patent is extended or adjusted under 35 U.S.C. 154(b) by 82 days.

(21) Appl. No.: 10/897,780

(22) Filed: Jul. 21, 2004

(65) Prior Publication Data

US 2006/0016117 A1  Jan. 26, 2006

(51) Int. Cl.
*A01K 85/00* (2006.01)

(52) U.S. Cl. .................. 43/42.31; 43/17.1; 43/17.6

(58) Field of Classification Search ............. 43/42.31, 43/17.1, 17.6, 43.13
See application file for complete search history.

(56) References Cited

U.S. PATENT DOCUMENTS

| | | | |
|---|---|---|---|
| 2,757,475 A * | 9/1956 | Pankove | 43/17.1 |
| 3,213,562 A | 10/1965 | Salvin et al. | |
| 3,310,902 A | 3/1967 | Godby | |
| 3,414,873 A | 12/1968 | Richard et al. | |
| 3,416,254 A | 12/1968 | Bornzin | |
| 4,175,348 A * | 11/1979 | Ray | 43/17.6 |
| 4,221,068 A | 9/1980 | Roemer, Jr. | |
| 4,583,313 A | 4/1986 | Dugan, Jr. | |
| 4,628,630 A | 12/1986 | Bohme | |
| 4,669,213 A | 6/1987 | LeRoy | |
| 4,805,339 A * | 2/1989 | Fuentes et al. | 43/42.31 |
| 4,945,670 A | 8/1990 | Wetherald | |
| 5,003,719 A | 4/1991 | Whitlock et al. | |
| 5,157,857 A | 10/1992 | Livingston | |
| 5,177,891 A * | 1/1993 | Holt | 43/17.1 |
| 5,195,266 A * | 3/1993 | Troescher | 43/17.6 |
| 5,331,760 A * | 7/1994 | DuMont | 43/17.1 |
| 5,412,897 A | 5/1995 | Smith | |
| 5,485,697 A | 1/1996 | Watson et al. | |
| 5,608,986 A | 3/1997 | Spurgeon et al. | |
| 5,697,182 A | 12/1997 | Rodgers | |
| 6,098,331 A | 8/2000 | Kim et al. | |
| 6,481,148 B1 | 11/2002 | Lindgren | |
| 6,564,497 B1 | 5/2003 | Jackson, II et al. | |
| 6,647,659 B1 * | 11/2003 | King et al. | 43/17.6 |
| 2002/0050091 A1 | 5/2002 | Jackson, II et al. | |
| 2004/0200122 A1 * | 10/2004 | Aanenson et al. | 43/17.6 |

* cited by examiner

*Primary Examiner*—Teri Pham Luu
*Assistant Examiner*—Kimberly S. Smith
(74) *Attorney, Agent, or Firm*—Gray, Plant, Mooty, Mooty & Bennett, PA

(57) ABSTRACT

A downrigger apparatus to hold a fishing line at a selected fishing depth in game fish inhabited water, and a sound emitting device attached to the downrigger cable of the downrigger apparatus. The downrigger apparatus includes a reel and a downrigger cable spooled on the reel. The free end of the downrigger cable extends to a depth beyond the selected fishing depth. A downrigger weight is attached at the free end of the cable. A sound emitting device is attached to the downrigger cable and emits sounds attractive to the fish. Sound waves travel through the water a range extending beyond the visual range of the fish. Fish, although out of visual range of the lure, detect the sound and travel toward the source. The fish eventually comes in to visual range of the lure being trolled behind the fishing boat. The fish is attracted to and takes the lure. The sound emitting device can generate intermittent sounds. There can be a period of silence, for example a 25 second silence interval, followed by a sound emitting period, for example five seconds. The sound emitting device is effective to attract fish at those depths where darkness greatly impedes the visual range of the fish. The sound emitting device can be powered by a rechargeable battery pack.

13 Claims, 3 Drawing Sheets

DOWNRIGGER APPARATUS WITH SOUND EMITTING DEVICE

BACKGROUND OF THE INVENTION

In deep sea sport fishing a downrigger apparatus is used to maintain a fishing line at a selected fishing depth beneath the surface of game fish inhabited water. The downrigger apparatus is fixed to the boat. It includes a large reel usually connected to a boom and a supply of stainless steel downrigger cable spooled on the reel. The cable extends from the reel and is trained over the boom tip and into the water. The free end of the cable extends to a depth which is a function of the selected fishing depth in that it will be a depth greater than the selected fishing depth. A trolling weight is attached to the end of the cable in the water. The reel can be manually or electrically operated. Conventional fishing tackle is used along with the downrigger apparatus. A fishing rod line is releasably attached to the downrigger cable by means of a release clip at approximately the selected fishing depth in the water. The release clip secures a segment of the fishing line at the desired depth. During trolling, the fishing line descends generally vertically to the release clip, and then rearward from the release clip. A lure attached to the end of the fishing line is maintained at about the selected depth and trails horizontally. Upon the abrupt impact of a fish striking the lure, the release clip releases the fishing line from the downrigger cable. The fish is then conventionally landed with the fishing tackle.

A typical deep sea fishing depth might be 150 feet to 200 feet. At that depth there is little or no light from the sea surface whereby the lure is not as visually apparent to the fish as it is at a lesser depth. At such a depth, the fish is more apt to perceive sound before it perceives the visual attraction of a fishing lure. Sound waves are readily transmitted through the water. Game fish have a sensitive ear enabling them to hear sounds transmitted through the water. Additionally, fish have lateral line organs that enable them to sense sound wave vibration in the water. The fish are apt to associate the sound with a prey in distress and be attracted to the source.

SUMMARY OF THE INVENTION

The invention pertains to a downrigger apparatus to hold a fishing line at a selected fishing depth in game fish inhabited water, and to a sound emitting device attached to the downrigger cable of the downrigger apparatus. The downrigger apparatus includes a reel and a downrigger cable spooled on the reel. The reel can be attached to a downrigger rod or boom. The downrigger cable extends from the reel and is trained over the end of the boom. The free end of the downrigger cable extends to a depth that is a function of the selected fishing depth in that it extends to a depth beyond the selected fishing depth. A downrigger weight is attached at the free end of the cable. The downrigger apparatus includes a sound emitting device that emits sound in order to attract fish. The sound emitting device is attached to the downrigger cable. The sound waves travel through the water a range extending beyond the visual range of the fish. Fish, although out of visual range of the lure, detect the sound and travel toward the source. The fish eventually comes in to visual range of the lure being trolled behind the fishing boat. The fish is attracted to and takes the lure.

The sound emitting device can generate high frequency sound waves known to attract fish. The sound can be intermittent. There can be a period of silence, for example a 25 second silence interval, followed by a sound emitting period, for example five seconds. The sound emitting device includes a housing of PLEXIGLAS® plastic or the like. Device components are encapsulated in the housing and protected from the adverse influence of pressure encountered at ocean depths. The sound emitting device is effective to attract fish at those depths where darkness greatly impedes the visual range of the fish. The sound emitting device can be powered by a rechargeable battery pack.

IN THE DRAWINGS

Figure 6:
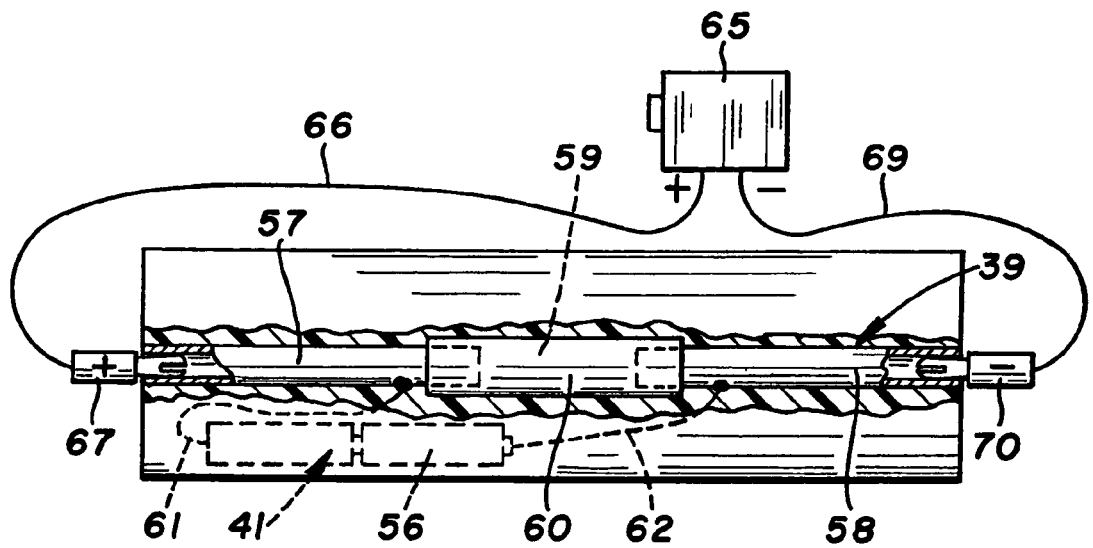
Figure 5:
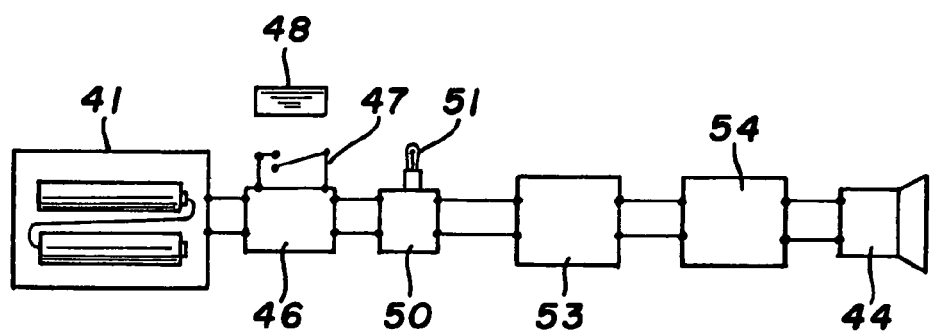

FIG. 5 schematically depicts one form of a circuit diagram for the sound emitting device; and FIG. 6 illustrates one form of a battery charging apparatus for the sound emitting device.

DESCRIPTION OF A PREFERRED EMBODIMENT

Figure 1:
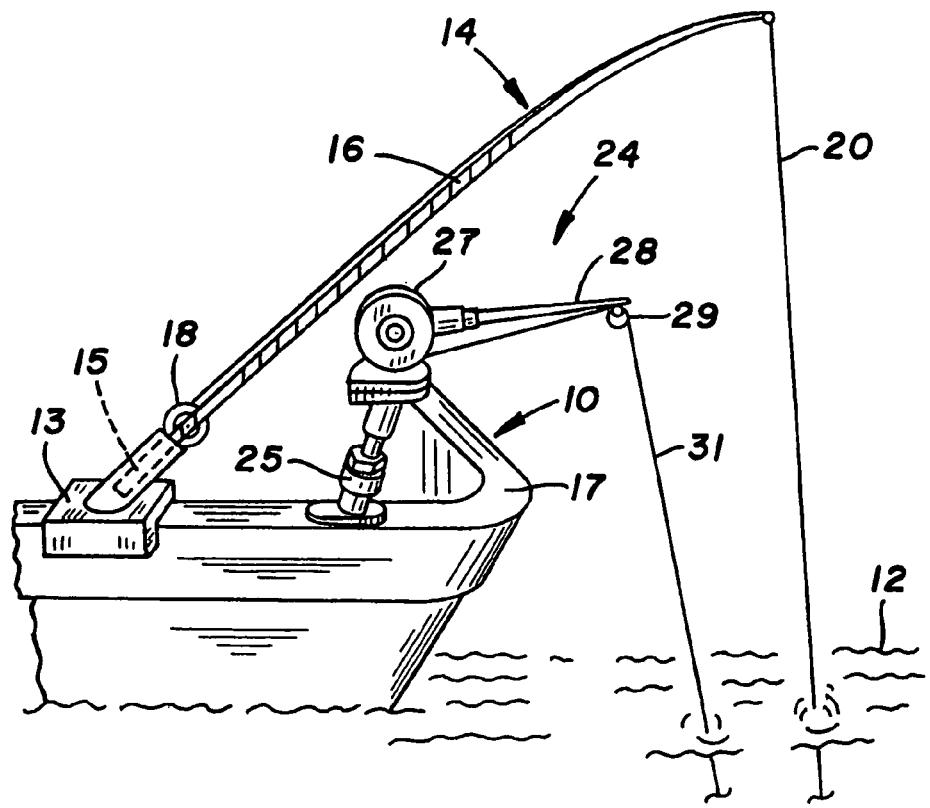
FIG. 1 is a side view of a portion of the stem of a fishing boat equipped with a downrigger apparatus according to the invention in use along with fishing tackle to catch game fish.

Referring to the drawings, FIG. 1 shows the stem 10 of a fishing boat in a body of water 12 inhabited by game fish. Standard fishing tackle includes a fishing rod 14 that can be installed in a holder 13 mounted to the boat or can optionally be carried by a fisherman in known and conventional fashion. Fishing rod 14 has a handle 15, a flexible rod section 16, a reel 18 and a fishing line 20. A fish lure 22 is connected at the submerged end of the fishing line 20.

A downrigger apparatus according to the invention is indicated generally at 24 and is mounted on a bracket or holder 25 assembled to the gunnel 17 of boat 10. The downrigger apparatus 24 includes a downrigger reel 27 connected to a boom 28. The tip of the boom 28 carries a guide loop or a pulley 29. A downrigger cable 31 is spooled on the reel 27. Cable 31 will typically be stranded wire. Downrigger cable 31 is trained over the pulley 29. The free end of cable 31 descends to a depth in water 12 that is a function of the selected fishing depth in that it is below the intended fishing depth. A trolling weight 32 is attached to the end of the downrigger cable 31 to maintain the cable somewhat horizontal while the boat 10 is moving slowly ahead. A conventional line holding clip 33 is attached to the downrigger cable 31 at approximately the selected fishing depth. The line holding clip 33 engages a segment 20B of the fishing line 20. The fishing line is trained through the holding clip 33 and extends rearward from it at segment 20C. Typically the holding clip 33 will be a release clip of a conventional variety which will release the fishing line 20 upon the impact of a fish taking the lure 22. Examples of such release clips are those sold by Scotty Fishing, Marine and Outdoor Products of Sidney, British Colombia, Canada. When a fish takes the fish lure 22 the abrupt tug on the fishing line segment 20C causes the fishing line to pull away from the release clip 33 whereupon the fisherman in control of the fishing rod 14 proceeds to land the fish.

The weight 32 keeps the fishing line section 20C located well beneath the surface of the water at an intended depth to hunt for fish. This depth may be as much as 150 or 200 feet or more in the case of deep sea fishing. At that depth there is little light for the fish to visually perceive the fish lure 22.

Downrigger apparatus 24 includes a sound emitting device 35. The sound emitting device 35 is attached to the downrigger cable 31. It can be attached in the vicinity of the weight 32 or in the vicinity of the release clip 33 or at some other convenient location on the downrigger cable 31. The sound emitting device can itself be heavy enough to function as a trolling weight. The sound emitting device 35 emits sound waves in the water that are perceived by the fish. The sound is preferably one that is attractive to the fish such as a sound mimicking a prey. This can be a high pitch sound. Sound waves indicated at 36 emitted by the sound emitting device 35 travel through the water a range that is substantially greater than the range that the fish lure 22 can be visually perceived. A fish upon perceiving the sound signal generated from the sound emitting device 35 will move toward it guided by the sound. Upon approaching the sound emitting device 35 the fish comes within visual range of the fish lure 22. Upon visual perception of the fish lure 22, the fish is attracted to it and takes the bait in the usual fashion.

Figure 2:
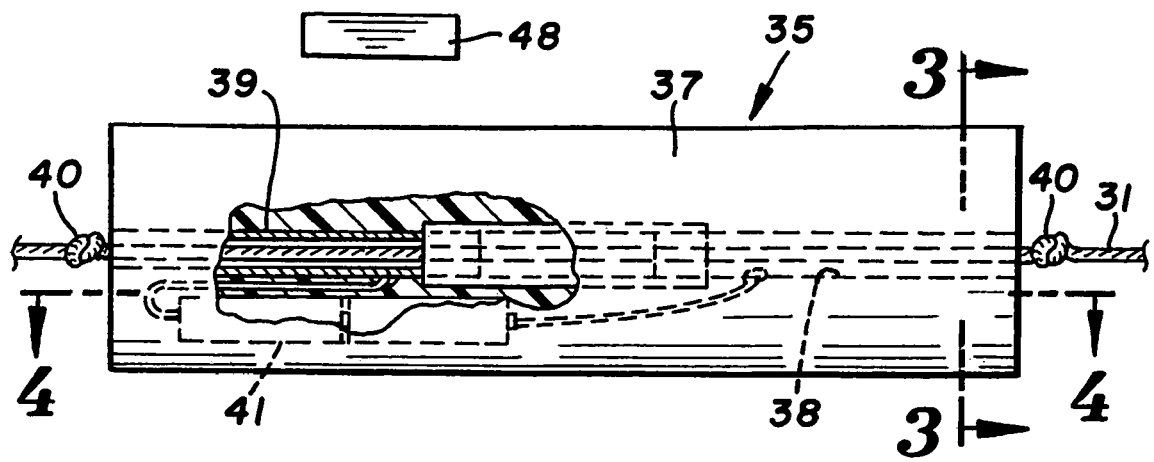
FIG. 2 is an enlarged side elevational view of the sound emitting device of the downrigger apparatus of FIG. 1 with a portion broken away for purposes of illustration.
Figure 3:
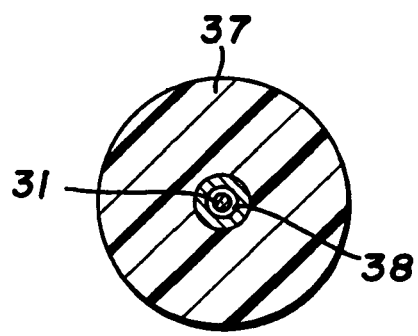
FIG. 3 is a sectional view of the sound emitting device of FIG. 2 taken along the line 3—3 thereof.
Figure 4:
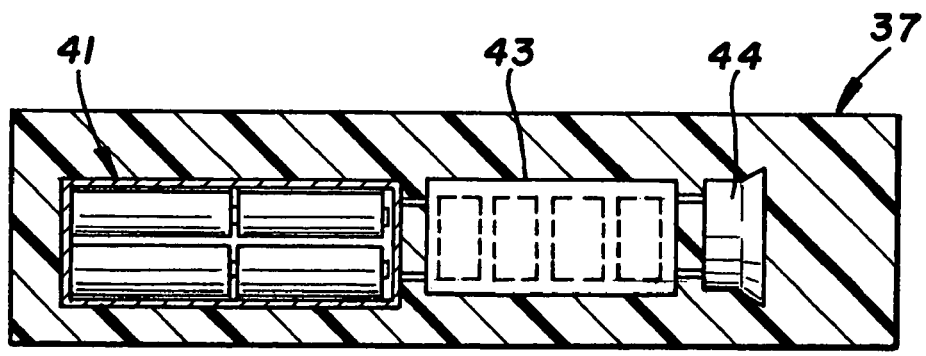
FIG. 4 is a sectional view of a portion of the sound emitting device of FIG. 2 taken along the line 4—4 thereof and schematically illustrating the internal components thereof.

The sound emitting device 35 is shown in enlarged side view in FIG. 2 and in sectional views in FIGS. 3 and 4. The sound emitting device 35 is attached to the downrigger cable 31 by any preferred means. As shown, the sound emitting device 35 has a body or housing 37 with an axial, central opening 38. The downrigger cable 31 passes through the central opening 38. A central tube 39 is installed in the central opening 38 and serves as an anti-chaffing conduit for the cable 31. Housing 37 is held in place on cable 31 by knots 40 at either end. Other structure such as releasable clips could be used to hold the housing 37 in place.

FIG. 4 depicts the internal components of sound emitting device 35 that are installed in the housing 37. The housing 37 can be filled with a suitable encapsulating material such as an epoxy resin or equivalent material. The various components are potted by the material in body 37 whereby they are protected from the effects of salt water and water pressure. The components include a rechargeable battery pack 41. Battery pack 41 is connected to a mounting board or circuit board 43 carrying other components that are in turn connected to a sound generator 44.

An example of a circuit is schematically depicted in FIG. 5. Battery pack 41 is connected to a switch circuit 46. Switch circuit 46 is controlled by a magnetically actuated reed switch 47 which alternately powers-on and powers-off the circuit. Reed switch 47 is actuated by a permanent magnet 48. Magnet 48 held proximate to reed switch 47 momentarily closes reed switch 47 to toggle the switch circuit between on and off positions. Magnet 48 is held outside of the body 37 by the fisherman in turning the sound generator on and off.

A lamp circuit 50 is connected to the switch circuit 46 and includes a lamp 51. Lamp 51 is "on" when the sound generator circuit is energized. Lamp 51 is visible through the clear side walls of body 37.

The battery pack 41 is connected to a timer circuit 53. The timer circuit 53 is connected to amplifier and driver circuits 54 connected to the sound generator 44. The timer circuit is conventional. The timer circuit can include conventional circuit elements such as a National Semiconductor LMC555 CMOS Timer. The sound generator emits an intermittent variable high pitch sound attractive to the fish. The timer circuit 53 controls the sound/silence duration. The timer circuit 53 can cause the sound generator unit 44 to be energized for a specific interval followed by a silence interval. For example, the sound generator 44 can be energized for about a five second interval followed by about a 25 second interval of silence.

The amplifier and driver circuits 54 are also conventional in the operation of the sound generator 44 and can include conventional elements such as a Motorola MC34119 low power audio amplifier and the National Semiconductor LM13700 amplifier.

Battery pack 41 can be rechargeable. The battery pack can include a plurality rechargeable nickel hydride batteries 56 and a recharging circuit. Central tube 39 is brass or another electrically conductive material. It is split into first and second sections 57 and 58 separated by a gap 59. The interior ends of the tube sections 57, 58 are connected by an electrically-insulating connector 60 spanning gap 59. Battery pack 41 has positive and negative terminals. A first battery pack lead 61 connects the first tube section 57 to one terminal of the battery pack, or the positive (+) terminal. A second battery pack lead 62 connects the other or negative (−) terminal of the battery pack to the second tube section 58. The outer ends of the tube sections 57, 58 are open at the ends of housing 37 and are accessible for receipt of leads from a battery charger when the housing is not installed on a downrigger cable.

A battery charger 65 is provided. Battery charger 65 can be connected to a source of AC current, or to a source of DC such as a boat battery. Charger 65 has first and second battery charger leads which include a positive lead 66 that terminates in a first banana plug 67 and a negative lead 69 that terminates in a second banana plug 70. Each of the banana plugs has a connector that fits into and makes electrical connection with one of the sections 57, 58 of central tube 39. The ends of the tube sections 57, 58 and the banana plugs can be color coded to assure proper connection.

In use of the battery charging apparatus, the sound emitting device is detached from the downrigger cable. The banana plugs 67, 70 are installed in the respective ends of the tube sections 57, 58. The tube sections connect to the rechargeable battery pack 41. When the charger 65 is energized the batteries of the battery pack recharge.

In the use of the downrigger apparatus, the sound emitting device is installed on the downrigger line. The sound generator circuit is activated by the fisherman holding a magnet 48 proximate to the side wall of body 37 to trigger the reed switch 47. The downrigger apparatus is lowered into the water in engagement with the fishing line in usual fashion. The lamp 51 tells the fisherman that the sound generator circuit is energized.

The sound generator generates sound waves according to the timing circuit. The sound waves are emitted for a period of time such as five seconds, followed by a silent period of, for example, 25 seconds. The sound generator emits a sound that will attract a game fish, such as that of an aquatic prey in distress. The sound is detected by the fish at a distance far greater than that at which it would see the lure. The fish is drawn toward the sound until it is able to see the lure. The fish takes the lure whereupon the fishing line is released from the downrigger cable and the fisherman lands the fish in the usual fashion.

While there has been shown and described a certain embodiment of a downrigger apparatus according to the invention, it will be apparent to those skilled in the art that certain deviations could be made from the embodiment without departing from the scope and spirit of the invention.

The invention claimed is:

1. A downrigger apparatus to hold a fishing line at a selected fishing depth in water inhabited by sport fish, comprising:
   a downrigger reel that can be connected to a boat;
   a length of downrigger cable spooled on the reel with a free end that can be extended into the water to a depth that is a function of the selected fishing depth;
   a fishing line release clip attached to the downrigger cable at a location on the cable that is approximately at the selected fishing depth when the downrigger cable is spooled into the water;
   a sound emitting device attached to the downrigger cable at a location on the cable so as to be submerged in the water when the free end is extended into the water said depth that is a function of the selected fishing depth;
   said sound emitting device including:
      a waterproof housing;
      a battery pack installed in the housing having first and second terminals and including a plurality of rechargeable batteries;
      a sound generator installed in the housing that can generate a sound tat is attractive to game fish;
      a timing circuit installed in the housing connected to the sound generator, the timing circuit configured to sequentially energize the sound generator for about a five second interval followed by about a 25 second interval of silence;
      an on/off switch circuit in the housing connected between the battery pack and the sound generator to selectively turn the power from the battery pack on and off the on/off switch circuit including a magnetically actuated reed switch operable through the use of a magnet held exteriorly to the housing;
   a tube installed centrally in the housing and extending substantially from end-to-end therein, said tube having open ends at outer ends of the housing, said tube accommodating a section of the downrigger cable when the housing is installed on the downrigger cable.

2. The outrigger apparatus of claim 1 including:
   a battery recharging circuit for recharging the batteries of the battery pack when the sound generating device is removed from the outrigger cable;
   said battery recharging circuit including said tube, said tube being formed of an electrically conductive metal and being divided into first and second tube sections separated by an electrically insulating gap, each tube section having an accessible end open at an outer end of the housing;
   a first battery pack lead connected to the first tube section and connected to the first terminal of the battery pack;
   a second battery pack lead connected to the second tube section and connected to the second terminal of the battery pack;
   a battery charger having a first battery charger lead and a second battery charger lead;
   said first battery charger lead connectable to the accessible end of the first tube section, and said second battery charger lead connectable to the accessible end of the second tube section whereby the battery pack can be recharged with the first and second battery leads connected to the first and second tube sections.

3. The downrigger apparatus of claim 2 wherein:
   said first and second battery charger leads have banana plug terminals to fit into the accessible ends of the first and second tube sections.

4. The downrigger apparatus of claim 3 including:
   an epoxy resin filling the interior space of the housing and encapsulating the items therein.

5. A downrigger apparatus to hold a fishing line at a selected fishing depth in water inhabited by sport fish, comprising:
   a downrigger reel that can be connected to a boat;
   a length of downrigger cable spooled on the reel with a free end that can be extended into the water to a depth tat is a function of the selected fishing depth;
   a fishing line release clip attached to the downrigger cable at a location on the cable that is approximately at the selected fishing depth when the downrigger cable is spooled into the water;
   a sound emitting device attached to the downrigger cable at a location on the cable so as to be submerged in the water when the free end is extended into the water said depth that is a function of the selected fishing depth;
   said sound emitting device including:
      a waterproof housing;
      a battery pack installed in the housing having first and second terminals and including a plurality of rechargeable batteries;
      a sound generator installed in the housing that can generate a sound that is attractive to game fish;
      a timing circuit installed in the housing connected to the sound generator, the timing circuit configured so that the sound generator will intermittently generate a sound with intervals of silence between periods of sound;
      an on/off switch circuit in the housing connected between the battery pack and the sound generator to selectively turn the power from the battery pack on and off, said on/off switch including a magnetically actuated reed switch operable through the use of a magnet held exteriorly to the housing and;
   a tube installed centrally in the housing and extending substantially from end-to-end therein, said tube having open ends at outer ends of the housing, said tube accommodating a section of the downrigger cable when the housing is installed on the downrigger cable.

6. The downrigger apparatus of claim 5 including:
   a battery recharging circuit for recharging the batteries of the battery pack when the sound generating device is removed from the outrigger cable;
   said battery recharging circuit including said tube, said tube being formed of an electrically conductive metal and being divided into first and second tube sections separated by an electrically insulating gap, each tube section having an accessible end open at an outer end of the housing;
   a first battery park lead connected to the first tube section and connected to the first terminal of the battery pack;
   a second battery pack lead connected to the second tube section and connected to the second terminal of the battery pack;
   a battery charger having a first battery charger lead and a second battery charger lead;
   said first battery charger lead connectable to the accessible end of the first tube section, and said second battery charger lead connectable to the accessible end of the second tube section whereby the battery pack can be recharged with the first and second battery leads connected to the first and second tube sections.

7. The downrigger apparatus of claim 6 including:
   an epoxy resin filling the interior space of the housing and encapsulating the items therein.

8. The downrigger apparatus of claim 7 including:
a trolling weight connected to the free end of the downrigger cable.

9. The downrigger apparatus of claim 8 including:
a downrigger boom having one end connected to the downrigger reel;
said downrigger cable being trained over the end of the downrigger boom opposite the reel.

10. A sound emitting device for attachment to a downrigger cable of a downrigger apparatus of the type for holding a fishing line at approximately a selected fishing depth in water inhabited by game fish, comprising:
a housing;
a battery pack installed in the housing;
a sound generator installed in the housing that can generate a sound that is attractive to game fish;
a timing circuit installed in the housing connected to the sound generator, the timing circuit configured so that the sound generator will intermittently generate a sound with intervals of silence between periods of sound;
an on/off switch circuit in the housing connected between the battery pack and the sound generator to selectively turn the power from the battery pack on and off;
an epoxy resin filling the interior space of the housing and encapsulating the items therein and;
a tube installed centrally in the housing and extending substantially from end-to-end therein, said tube having open ends at outer ends of the housing, said tube accommodating a section of the downrigger cable when the housing is installed on the downrigger cable.

11. The sound emitting device of claim 10 including:
a battery recharging circuit for recharging batteries of the battery pack when the sound generating device is removed from the outrigger cable;
said battery recharging circuit including said tube, said tube being formed of an electrically conductive metal and being divided into first and second tube sections separated by an electrically insulating gap, each tube section having an accessible end open at an outer end of the housing;
a first battery pack lead connected to the first tube section and connected to the first terminal of the battery pack;
a second battery pack lead connected to the second tube section and connected to the second terminal of the battery pack;
a battery charger having a first battery charger lead and a second battery charger lead;
said first battery charger lead connectable to the accessible end of the first tube section, and said second battery charger lead connectable to the accessible end of the second tube section whereby the battery pack can be recharged with the first and second battery leads connected to the first and second tube sections.

12. The sound emitting apparatus of claim 11 wherein:
said first and second battery charger leads have banana plug terminals to fit into the accessible ends of the first and second tube sections.

13. The sound emitting device of claim 12 wherein:
the on/off switch circuit includes a magnetically actuated reed switch operable through the use of a magnet held exteriorly to the housing.

* * * * *